United States Patent Office 3,187,826
Patented June 8, 1965

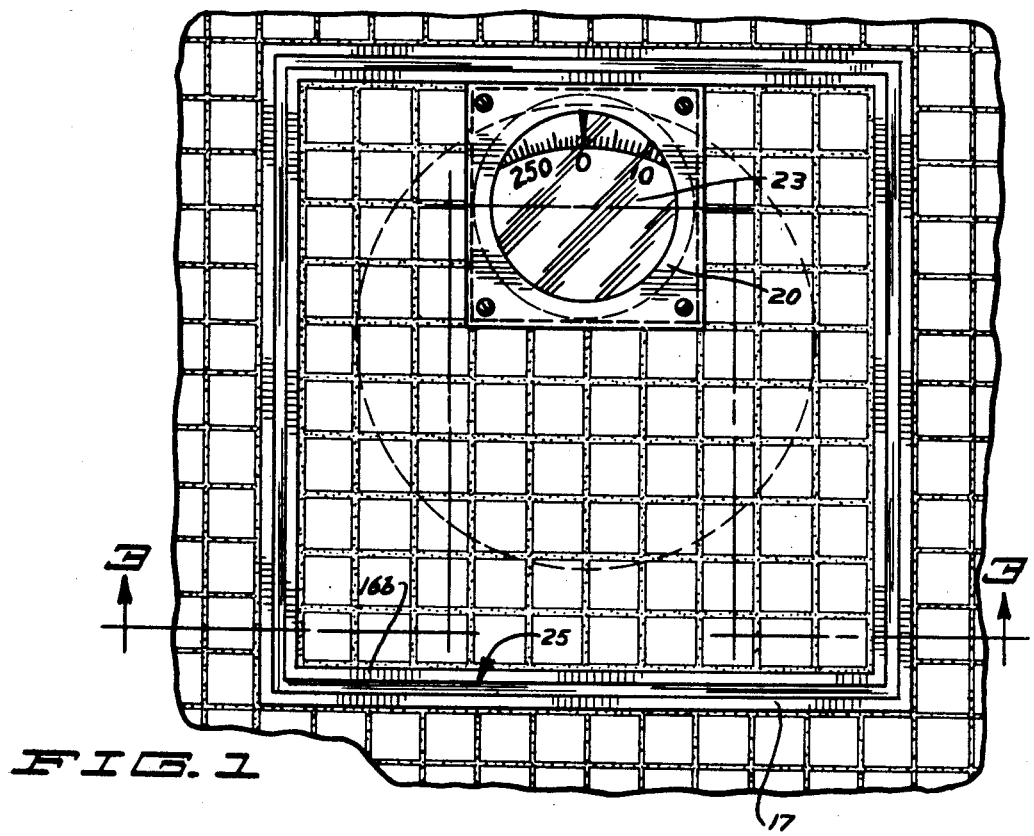
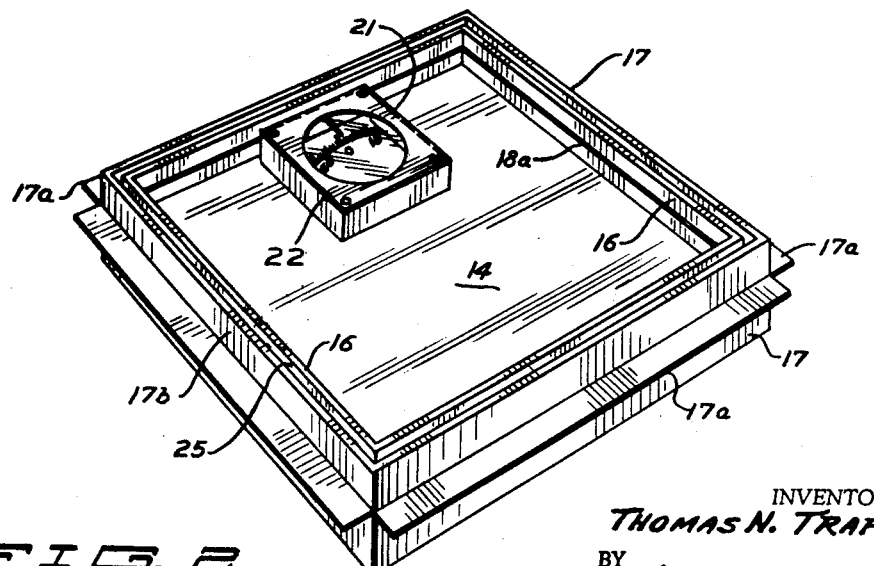

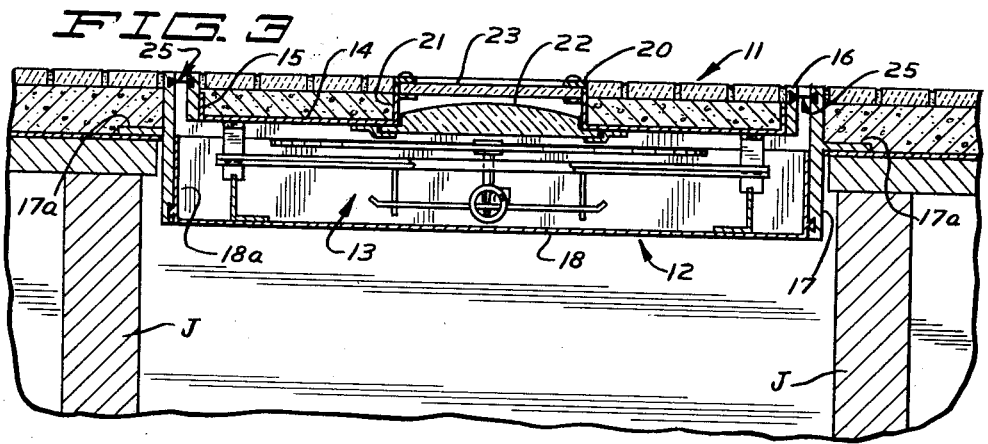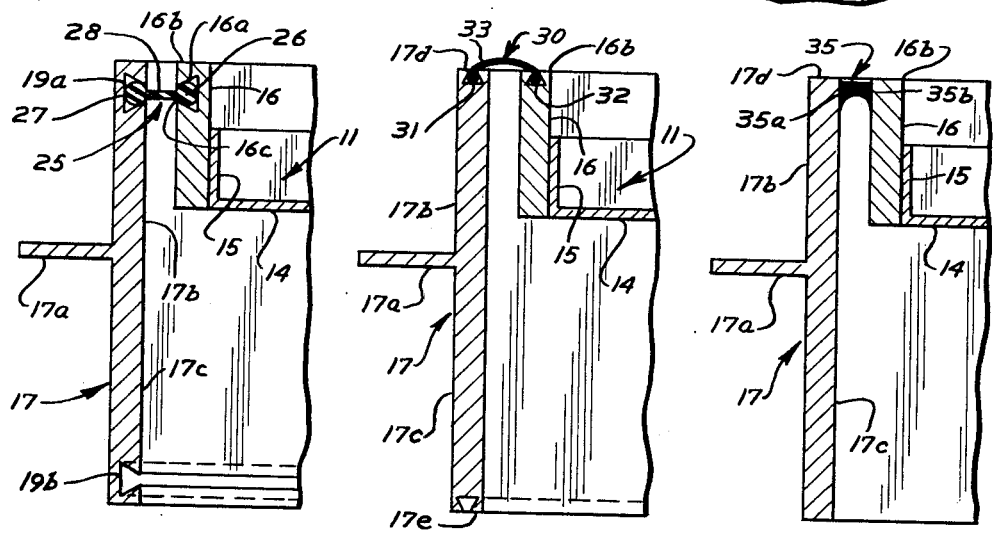

3,187,826
FLUSH FLOOR SCALE
Thomas N. Traff, Rte. 5, Wayzata, Minn.
Filed Jan. 20, 1964, Ser. No. 339,033
4 Claims. (Cl. 177—142)

This invention relates generally to bathroom scales and more particularly to a sealed scale for mounting directly into and to have the top weighing surface flush with the floor.

The evolution of bathroom scales has been from a large cumbersome model having a large upstanding dial face through stages which generally decrease in height and size until the present and most popular models are those which are streamlined in shape and generally low in height. The reason for this change is not only for the esthetic improvements but also for the fact that these scales are most often used in bathrooms and most homes cannot afford the room required by a large scale.

Applicant however has continued this evolution in design by providing a bathroom scale which is mountable as a built-in product directly in the bathroom floor such that the top weighing surface will be essentially flush with the floor. In order to provide this built-in feature applicant has had to provide a means for sealing the scale against the entrance of water which sealing method must also be provided in such a manner that the scale reading would not be affected by the resistance of the seal to movement.

With the sealed scale provided by applicant it is possible to provide a built in bathroom scale or for that fact a scale which may be built in the floor of other rooms of the house which is effectively sealed against dirt and moisture and further sealed in such a manner so as to not affect the weighing qualities of the scale.

In providing this scale applicant has also provided a mounting method by which the scale may be mounted in bathroom floors having various floor coverings such as ceramic tile and still be substantially flush with the top surface of the floor.

It is therefore an object of applicant's invention to provide a sealed scale unit which effectively seals the movable weighing table to a stationary base unit of the scale but which allows complete freedom of movement of the table such that the reading of the scale will not be affected by the resistance of the seal to movement.

It is a further object of applicant's invention to provide a bathroom scale which may be mounted directly into and be supported by the substructure of the floor to provide a weighing surface which is flush with the remainder of the floor.

It is a specific object of applicant's invention to provide a sealing member for effectively sealing a weighing scale table to a scale base housing which will permit complete freedom of movement between the scale members such that the reading provided by the scale will not be affected by the seal member.

It is a further specific object of applicant's invention to provide a scale unit which is adapted for mounting directly into the floor of a dwelling and which when mounted therein will form a part of the floor and will be sealed against water to provide a scale of particularly long life.

These and other objects and advantages of my invention will more fully appear from the following description made in connection with the accompanying drawing, wherein like reference characters refer to the same or similar parts throughout the several views, and in which:

FIG. 1 is a plan view of the scale as it would appear installed in a tiled bathroom floor;

FIG. 2 is a perspective view of the scale unit;

FIG. 3 is a vertical section taken substantially along line 3—3 of FIG. 1 showing the mounting and installation methods for the scale; and FIGS. 4, 5 and 6 are section views of a portion of FIG. 3 being drawn to an enlarged scale and illustrating sealing methods used to seal the scale unit.

In accordance with the accompanying drawings applicant's sealed scale generally comprises a scale table 11 mounted for weighing oscillation in a housing base generally designated 12. It should be pointed out initially that the scale mechanism generally designated 13 is well known in the field and comprises a dial scale unit which may be obtained through various manufacturers. The important aspect of this invention is the means for sealing the scale to effectively provide a water tight seal between the scale weighing table 11 and the housing 12 such that the scale mechanism 13 will remain dry and in addition there will be no effective resistance produced by the seal to cause an incorrect weighing.

In the form shown the table 11 comprises a substantially flat base member 14 having an upstanding rim member 15 completely therearound which rim member serves as a fastening element for securing the table 11 to an upstanding seal housing flange unit 16 which similarly surrounds all sides of the table 11. The flange 16 comprises an extruded member which, as more easily seen in FIG. 4 is provided with a trapezoidal groove 16a in closely spaced arrangement to the top surface 16b. As seen in FIG. 4 the diminished side of the trapezoidal groove 16a permits entrance into the housing flange 16 such that an O-ring seal generally designated 25 which will be described in greater detail hereinafter may be securely held therein. The upstanding flange member 15 as previously stated completely surrounds the flat base section 14 of table 11 and likewise the O-ring housing flange member 16 is arranged completely around all sides of the table 11 such that the O-ring seal 25 will completely bound the table 11. This construction provides a depressed pan on the upper surface of table 11.

The housing and base unit 12 comprises a pan member 18 with upstanding side members 18a and completely therearound. Fastened to the upstanding flange 18a and completely surrounding the base unit 12 is a seal mounting T-section designated in its entirety 17 and which comprises sections joined to form an open top box unit such that the table 11 may oscillate freely therein.

As best shown in FIG. 4 the T-section 17 comprises a short laterally extending mounting leg 17a for mounting the unit on top of a floor substructure such as between two floor joists J. The arms of the T-section 17 as shown in FIG. 4 are designated 17b, 17c and as illustrated, arm 17b is substantially shorter than arm 17c. On each of the arms 17b, 17c a trapezoidal O-ring groove designated 19a, 19b is formed to be in opposing relation to the O-ring groove 16a in the scale table flange 16. The arms 17b, 17c are of substantially different lengths to accommodate the thicknesses of the floors into which the scale unit is mounted such that the scale will be flush with the floor.

As shown in FIGS. 1, 2 and 3 the base portion 14 of the scale table 11 is below the top 16b of flange 16 such that tile or other floor surfacing material may be laid thereupon and be flush with the flange 16. This construction allows the builder to lay tile therein such that the scale will actually appear to be a portion of the floor.

In the form shown, to provide a scale indicator 23 on the upper surface of the scale again level with the floor, a bezel 20 is mounted on an upstanding flange 21 which extends upwardly from the base portion 14. A magnifier 22 may be sealingly mounted within the lower confines of flange 21. The indicator viewing glass 23 is mounted below the bezel 20 to afford a sealed arrangement for the scale sitting apparatus.

As previously stated the most important aspect of the sealed scale unit is embodied in the seal member 25 sealing the table 11 to the base 12. In the preferred form as shown in FIG. 4 the seal 25 comprises a pair of spaced apart O-rings 26–27 receivable into the trapezoidal O-ring grooves 16a and the respective opposing O-ring groove 19a or 19b. The O-ring grooves are designed in this manner to effectively hold the seal therein during the scale oscillation. A joining substantially flat resilient section 28 is provided between the O-rings 26–27 and connected therewith. The connecting section 28 is substantially resilient and flexible to allow the scale table 11 to be depressed without retarding the measuring function of the scale apparatus 13. As the accuracy of a scale designed for this use is not particularly critical the seal does not require any particular critical dimensions other than to say that during installation it must not be in a stressed condition. As shown in FIG. 4 the T-section member 17 may be reversed end for end placing the opposite O-ring groove 19b in opposing relation to the table O-ring groove 16a such that the table could be mounted in a floor which is slightly thicker and would still maintain the scale in flush position with the floor. Naturally with this reversal the base support member 12 must still remain in proper position to support the scale mechanism 13 and table 11 in proper position such that the O-ring grooves are aligned.

A second form of seal is shown in FIG. 5 wherein numerals 16 and 17 are provided to indicate similar O-ring containing structures as that provided in the preferred form. The main differences between this and the preferred structure is the location of the seal containing grooves which will now be described. In this form trapezoidal O-ring grooves are formed on the upper surface 16b of the table flange 16 and the upper 17d and lower surfaces 17e of the mounting T-section flange 17. In this form the sealing member designated 30 again comprises a pair of O-rings designated 31–32 spaced apart by a flexible connector 33. This seal again extends on all sides of the scale unit and provides a flush surface sealing unit. Again the connecting portion 33 must be sufficiently flexible to allow deflection of the scale table 11 without impairing the scale reading.

The third form of this sealing arrangement is indicated in FIG. 6 which again shows the T-section 17 having the unequal arm sections 17b–17c and the upstanding flange 16 attached to the pan flange 15. The seal in this form generally designated 35 comprises a plano-concave member wherein the plane surface is disposed upwardly with respect to the upper surfaces 16b–17d of flanges 16–17 and the concave portion is arranged thereunder such that the sealing member may have its extreme edges 35a–35b adhesively joined to the flanges 16, 17 and operate as a hinge therebetween.

The T-section 17 in either of the last described cases may be reversed according to the height of the floor in which the unit is mounted. The seal shown in FIG. 6 must be of an extremely flexible material such that the hinge action is attained without presenting undue stresses upon the adhesively attached side elements 35a–35b of the seal 35.

To insert a scale of this type into a floor an opening is cut into the sub floor preferably between two floor joists to provide maximum support. The T-section leg 17a is located to abut with the floor and fastening means may be inserted therethrough to positively position the scale unit. The floor surfacing material may now be applied and the application will be made over the leg 17a to seal the scale unit positively into the floor. As shown in FIG. 1 the surfacing material may also be laid into and upon the scale table 11 recess defined by the base portion 14 and the upstanding flanges 15 and 16. All that will remain visible will be the dial indicator opening and the seal area surrounding the table.

It should be obvious that applicant has provided a new and unique method for sealing a scale in order to effectively seal out water from the working mechanism of the scale and further provide a seal which is sufficiently flexible to provide deflection of the scale table with no adverse affect on the reading of the scale.

It will, of course, be understood that various changes may be made in the form, details, arrangements and proportion of parts without departing from the scope of my invention, which generally stated consists in the matter set forth in the appended claims.

What I claim is:

1. A weighing scale for use in home bathrooms and the like adapted for mounting directly in the floor including:
    (a) a base member having a bottom and upstanding sides to provide an open top housing and being receivable into a recess provided in the floor;
    (b) laterally extending support flanges arranged on said base member to abut with and rest on the floor surrounding the recess and provide the sole support means for said base;
    (c) a scale table receivable into the open top portion of said base member and being vertically movable therein;
    (d) a scale mechanism positioned on said base and interposed between said table and said bottom supporting said table and being actuated by a weight placed on said table;
    (e) a flexible seal extending between the outer periphery of said table and the inner periphery of said open top base to seal said members to form a water tight housing for said scale mechanism but permitting oscillation of said table.

2. A weighing scale for use in home bathrooms and the like adapted for mounting directly in the floor including:
    (a) a base member having a bottom and upstanding sides to provide an open top housing and being receivable into a recess provided in the floor;
    (b) laterally extending support flanges arranged on the outer surfaces of said side members to abut with and rest on the floor surrounding the recess to provide the sole support means for said base;
    (c) a scale table receivable into the open top portion of said base member and being vertically movable therein;
    (d) a scale mechanism positioned on said base and interposed between said table and said bottom supporting said table and being actuated by a weight placed on said table;
    (e) a flexible seal extending between the outer periphery of said table and the inner periphery of said open top base to seal said members to form a water tight housing for said scale mechanism but permitting oscillation of said table.

3. The structure set forth in claim 2 wherein seal retaining grooves having a substantially trapezoidal cross section provided in cooperating opposed position on said table and said base member and said seal comprises a pair of spaced apart O-ring members receivable into said grooves respectively joined by a substantially flexible connecting member.

4. The structure set forth in claim 3 wherein the seal retaining groove on said table is arranged around the periphery thereof and the seal on said housing is arranged on the inner surfaces of said side members with the diminished portions of the cross sections being in face to face relation.

References Cited by the Examiner

UNITED STATES PATENTS

| | | |
|---|---|---|
| 1,655,835 | 1/28 | Fischer. |
| 1,710,125 | 4/29 | Van Berkel _____ 177—142 |
| 1,883,496 | 10/32 | Berson _____ 177—142 |
| 1,982,580 | 11/34 | Fischer. |
| 2,867,160 | 1/59 | Wangerow _____ 50—346 |
| 3,073,065 | 1/63 | Alderman et al. _____ 50—346 |

FOREIGN PATENTS

| | | |
|---|---|---|
| 1,093,624 | 11/54 | France. |
| 446,122 | 4/36 | Great Britain. |

LEO SMILOW, *Primary Examiner.*